Nov. 24, 1970   G. BANCHIERI   3,543,062
DIRECT WIRE COOLING IN SYNCHRONOUS ELECTRICAL MACHINES
Filed July 23, 1968   2 Sheets-Sheet 1

INVENTOR
GIUSEPPE BANCHIERI
BY Steinberg & Blake
ATTORNEYS

Nov. 24, 1970    G. BANCHIERI    3,543,062
DIRECT WIRE COOLING IN SYNCHRONOUS ELECTRICAL MACHINES
Filed July 23, 1968    2 Sheets-Sheet 2

INVENTOR
GIUSEPPE BANCHIERI
BY Steinberg & Blake
ATTORNEYS

United States Patent Office 3,543,062
Patented Nov. 24, 1970

3,543,062
DIRECT WIRE COOLING IN SYNCHRONOUS ELECTRICAL MACHINES
Giuseppe Banchieri, Via S. Massimo 3, Padova, Italy
Filed July 23, 1968, Ser. No. 746,965
Claims priority, application Italy, Aug. 10, 1967,
19,409/67
Int. Cl. H02k 9/19
U.S. Cl. 310—54                                   2 Claims

ABSTRACT OF THE DISCLOSURE

A synchronous electrical machine provided with hollow wires for liquid cooling. The machine has a rotor shaft as well as axial supply and discharge manifolds. Connector duct sets associate the hollow wires with the supply and discharge manifolds at the rotor shaft. A collecting member at which the connector duct sets terminate is hydraulically connected by radial ducts with the axial manifolds. These radial ducts are provided with a baffle dividing the interior thereof into a pair of substantially helicoidally extending channels with one end of the baffle disposed at 90° with respect to the other end thereof.

---

This invention relates to synchronous electrical machines having hollow wires directly cooled by a liquid, such as water, just running through the wire hollows. More particularly, the invention is concerned with improvements in or relating to the subject of U.S. patent specification No. 3,320,447, disclosing a synchronous electrical machine, preferably generator, wherein the hollow rotor wires were connected to inlet and outlet manifolds for cooling water, as located in the rotor axis, through sets of substantially radial connector ducts, terminating on axially projecting or recessed portions of the wire leading sections.

This invention relates to particular new and useful as well as ingenious solutions by which the set of nest of tubes are connetced to the concentric axial rotor commutators.

The object of the invention is to facilitate the solution of structural problems in directly liquid-cooled machines, while retaining an extreme reliability in operation, aiding in maintenance and at the same time facilitating the selection among the structural designs, wherein between inlet and outlet locations for cooling liquid in rotor wire there is half a coil, or one or more coils, depending on the various types of machines and length thereof.

According to the invention, the liquid-cooled synchronous machine, as provided with substantially radial duct sets or nests extending adjacent the head center line, is essentially characterized in that such duct or wire sets terminate on a commutating plate (at least one for each pole) which is hydraulically connected to two concentric axial manifolds by means of radial ducts (preferably baffled where the cooling liquid inlets and outlets in the rotor wire would be at the rotor head).

The invention will be better understood from the following detailed description, given by way of example and thus of not limitation, relating to a particular preferred embodiment thereof as shown in the accompanying drawings, in which.

Figure 1:
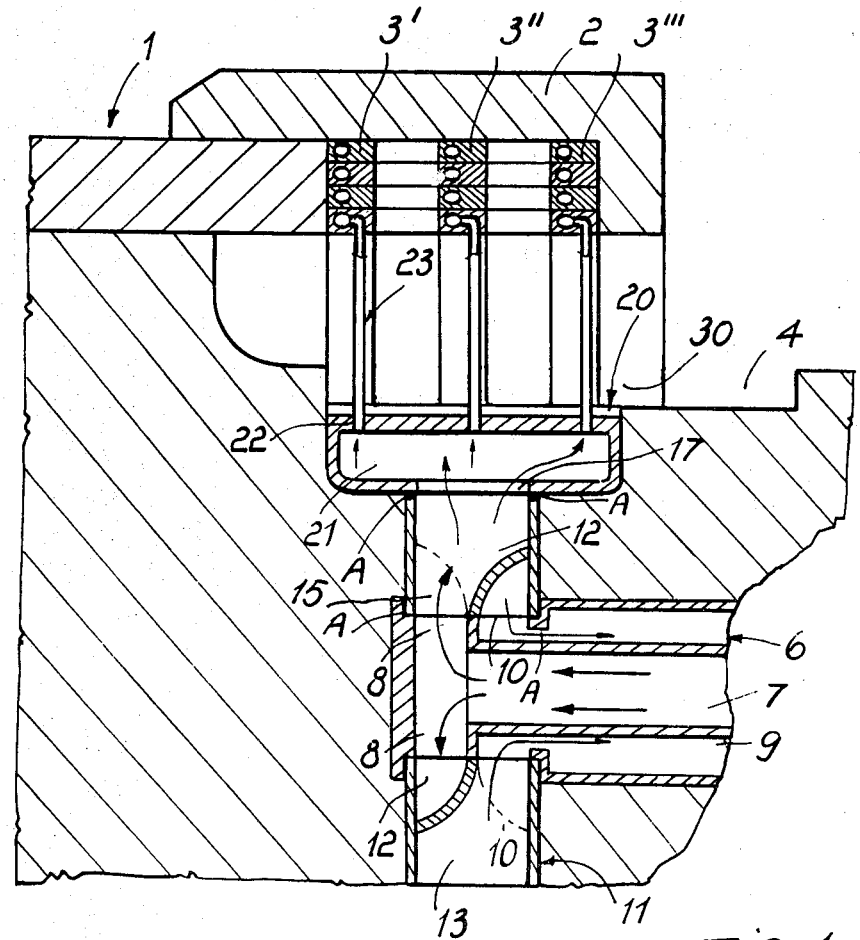
FIG. 1 is a diagrammatic sectional view axially showing one of heads for a bipolar turbogenerator, wherein the radial supply and exhaust connectors for the cooling water are located at the rotor side, such an axial section substantially corresponding to line I—I in FIG. 2.

Referring to the drawings, the rotor end to the slip rings is designated as a whole at 1. The rotor is comprised of a rotor cap 2 for radially containing under centrifugal stresses the hollow wires 3', 3'', 3'''. Wires 3', 3'', 3''' extend through rotor slots and along the heads, just where the wires are shown in a sectional view. Rotor structure is supported on an axis or shaft 4 passed through by a dead hole 5, wherein a conveying body, designated as a whole at 6, is introduced and defines an axial inner supply duct for cool water, terminating at an end of the instant bipolar generator with two semicircular radial ducts 8. Still within said body 6 there is provided a duct 9 concentrically of duct 7 and separated therefrom throughout its extension. Duct 9 also outwardly opens at two diametrically opposed locations through two semicircular openings 10. Each of ducts 8 communicate with channel 12 in baffled radial bodies 11, whereas each of openings 10 communicate with a separate duct 13 of such bodies.

Baffled bodies 11 are slipped within diametral holes 14 in rotor axis 4. In this particular example, said bodies 11 are formed as a circular tube and are divided into said two ducts 12 and 13 by a baffle 15, substantially helicoidally extending, by turning through 90°, from end to end, so that the outlets at an end of ducts 12, 13 are at right angles to those at the other end of said bodies 11.

Figure 3:
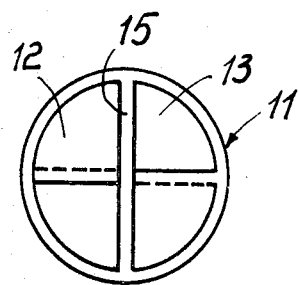
FIG. 3 is a view showing a baffled radial duct, as taken on line III—III of FIG. 2.
Figure 4:
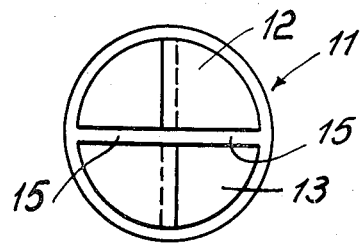
FIG. 4 is a view showing the baffled radial duct, as taken on line IV—IV of FIG. 2.

This is clearly seen in FIGS. 3 and 4, FIG. 3 showing a top view of duct 11 and FIG. 4 showing a bottom view thereof.

Figure 5:
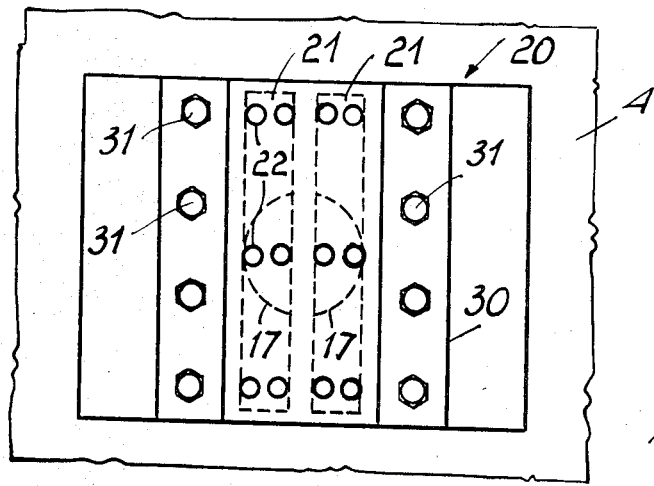
FIG. 5 is a diagrammatic view corresponding to line V—V of FIG. 2.

Radially outermost inlets for ducts 12 and 13 of bodies 11 each terminate at a semicircular inlet 17 (FIG. 5) in a so-called commutating or collecting plate designated as a whole at 20. On the radially innermost side, said commutating or collecting plates have two semicircular inlets, each of which moving with one of the outlets for ducts 12, 13.

Figure 2:
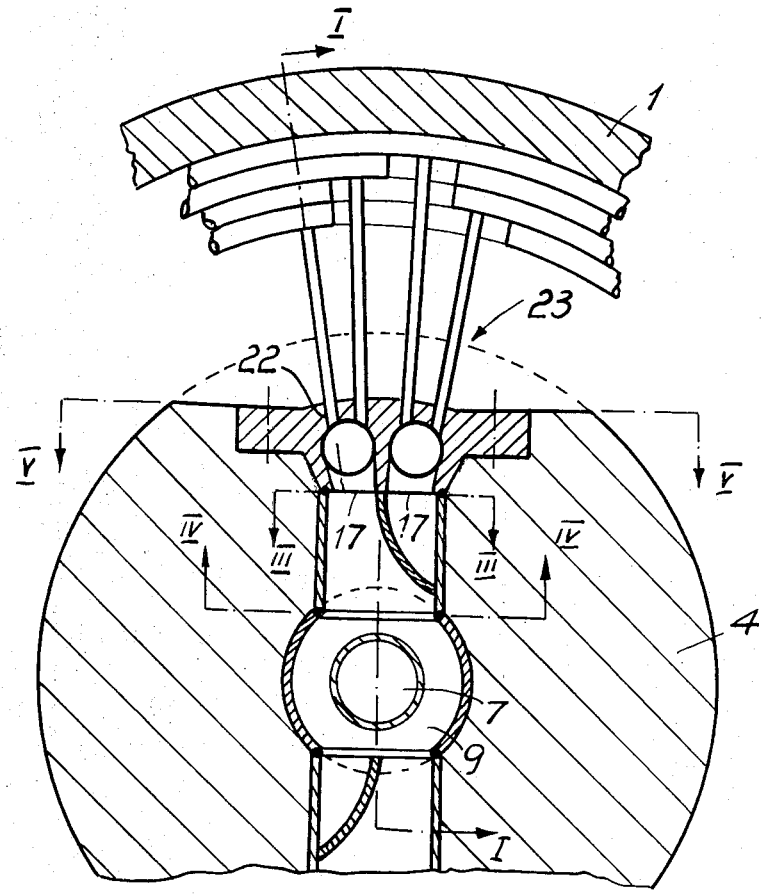
FIG. 2 is a cross-section of FIG. 1, approximately taken along one of the radial nests of the connector ducts.

Each of inlets 17 open into a different axial duct 21 in commutating or collecting plate 20. Each of said ducts 21 are connected by through openings 22 (see FIGS. 1 and 2) to a set or nest of substantially radial connector ducts. such a set or nest being shown at 23, at the center line of each head. One of ducts 21 is for water inlet and for conveying it to inlet connector ducts leading to hollow wires 3', 3'', 3''', while the other duct 21 collects the water which has passed through hollow wires 3', 3'', 3''' and discharging through the other connector ducts pertaining to set or nest 23.

More particularly, as seen from the drawings, since three units of wires 3', 3'', 3''' are provided at each head and each unit consisting of six wires, the commutating or collecting plate 20 will be connected with twelve connector ducts forming the set or nest 23, six of which are attached to one of ducts 21 and the other six being attached to the other duct 21 in said commutating or collecting plate 20.

Said commutating or collecting plate 20 is preferably arranged for facilitating the construction and assembly at a smoothed and cutaway zone 30 of rotor shaft or axis 4 and is secured to this axis by studs 31.

Tube set or nest 23 is further connected to the wires, more particularly to the heads thereof.

At the locations, indicated at A and identified by black areas, there can be provided ordinary seals. Tubes 23 can be provided with expansion bends or joints and insulating sections can be provided as well. The tube ends can be connected to holes 22 by screwing by means of ordinary connectors. As apparent, the structural details being of a normal design can however vary, as not exhibiting any novelty.

For machines wherein there is half a coil between inlet and outlet locations for the cooling liquid (corresponding to the highest cooling type), the inlet for the cooling fluid will be at one of the rotor heads, whereas the outlet will be at the opposite head. In this instance, bodies 11 are not baffled since it is unnecessary to have a dual duct (12, 13). However, there will always be present said commutating or collecting plate 20, one for each pole and side; that is, for a bipolar machine there will be four commutating or collecting plate 20, instead of two as shown.

Still in this case, what is required is only a sufficient extension for the innermost of the two concentric axial ducts through the axial hole in the rotor block to the level of the opposite heads. Still in this case, the commutating or collecting plate could also be provided with a single axial channel 21 instead of two channels as shown in the drawings.

Although only one embodiment of the invention has been described, it will now be easy for those skilled in the art to devise many changes and modifications, all of which are, however, to be considered as within the scope of this invention.

Further, the description is related to a bipolar synchronous machine having smooth poles (turboalternator), but it is apparent that the same concept is applicable, through suitable adaptations, also to preferably high power, salient pole machines (as connected to water or hydraulic turbines).

What I claim is:
1. A synchronous electrical machine having a rotor shaft and provided with hollow wires for liquid cooling, axial supply and discharge manifolds, and connector duct sets associating said hollow wires with said supply and discharge manifolds at said rotor shaft, a collecting member at which said connector duct sets terminate, and radial ducts hydraulically connecting said collecting member to said two axial manifolds, said radial ducts being provided with a baffle dividing the interior thereof into two substantially helicoidally extending channels with one end of said baffle disposed at 90° to the other end.

2. An electrical machine according to claim 1, wherein each of a plurality of said collecting members is retained to said rotor shaft at a smoothed zone thereof, the latter members being symmetrically and circumferentially disposed along the rotor periphery.

References Cited

UNITED STATES PATENTS

| 3,320,447 | 5/1967  | Banchieri     | 310—61 XR |
| 2,062,470 | 12/1936 | Mossay        | 310—57    |
| 3,131,321 | 4/1964  | Gibbs et al.  | 310—54    |
| 3,005,119 | 10/1961 | Schmitt et al.| 310—61    |

FOREIGN PATENTS 1,129,144   10/1968   Great Britain.

MILTON O. HIRSHFIELD, Primary Examiner

B. A. REYNOLDS, Assistant Examiner

U.S. Cl. X.R.

310—59, 64